United States Patent Office 3,084,207
Patented Apr. 2, 1963

3,084,207
STORAGE BATTERY AND METHOD OF
FORMING THE SAME
James Willis Hughes and Nathan J. Stowell, Jackson,
Miss.; said Stowell assignor to said Hughes
No Drawing. Filed June 29, 1961, Ser. No. 120,485
3 Claims. (Cl. 136—27)

The invention relates to batteries and to a method or process of forming the same, and more particularly to the manufacture of storage batteries of the pasted plate type, the broad object being to improve the operating characteristics of such batteries without adding materially to the cost thereof.

In conventional storage batteries, as is well known, the plates generally comprise a metal frame or grid cast from lead or a lead alloy such as an alloy of lead and antimony, to which grids are applied a suitable paste comprising principally oxide of lead (a yellow or red powder) moistened with a dilute acid solution such as sulphuric acid or ammonium sulphate. Other materials may be added to the paste, such as lamp black or the like, for improving the characteristics of the paste, particularly its porosity, the lead oxide, however, being the principal active material of the paste. It will be understood that any such additive may be employed within the scope of our invention in its broadest aspect, the invention, however, not being limited to the use of any particular porosity increasing or other additive.

After the application of the paste to the grid it is, as is well known, allowed to dry and form a hard mass, following which the plates are suspended in dilute sulphuric acid and an electric current passed through the plates. The hard paste on the plate, which carries the current out of the acid, is converted into a bluish gray lead sponge, while the other plate becomes lead peroxide having a chocolate brown color. The lead sponge plate is referred to as the negative, and the peroxide plate is referred to as the positive.

The above process is well known in the art and is referred to merely as a background for the description of the present process. A standard storage battery process is described, for example, in Chemistry in Industry, volume 2 (1929), beginning page 121, by H. E. Howe, to which reference may be had for a more detailed description of a standard or conventional process, the present invention being an improvement on what is now standard practice.

Among the objects of our invention may be mentioned the following:

(1) To reduce internal resistance of the battery by more evenly formed activated particles on positive and negative plates.

(2) To reduce temperatures affected by excessive rates of charge and discharge.

(3) To prevent shedding of active materials on the plates, both positive and negative.

(4) To fuse pasted particles on the grids of the positive and negative plates to prevent release from the grids.

(5) To fuse pasted particles more rigidly to grids to prevent shedding.

In accordance with our invention we expose both the positive and negative pasted plates prior to charging to compounds related to those which are normally present in the charge of a completed storage battery. More particularly, the positive plates are exposed to $SO_2$ gas, while the negative plates are exposed to $H_2O_2$. It will be understood that by "plates" reference is made to the usual pasted plates comprising a grid consisting principally of lead or lead alloy and having lead oxide paste applied thereto. Such paste may include, in addition to the essential lead oxide, such materials or additives as may be present in the usual conventional storage batteries now on the market. The following distinctive features were noted in connection with our invention:

(1) We have found that by placing the unformed positive plates in an environment of $SO_2$ a positive plate charged condition results. This is because in a normally charged battery the positive plates are in a solution of $H_2SO_4$ which gives the normal equivalent of $Pb \cdot H_2SO_4$. Then by charging it or applying an electromotive current to the terminals we liberate $H_2O_2$ which is collected on negative plates. This essentially leaves $PbSO_2$, providing both plates would conduct all combined ions respectively. However, the electrolyte must be higher and the positive plates are: $PbH_2SO_4$ with increased gravity. The negative plates in a completely charged battery are essentially then $PbH_2O_2$.

(1a) By taking $SO_2$ gas and pressurizing a chamber containing positive plates with a pressure anywhere from four to fifteen pounds per square inch it is possible to more completely bond the paste on the plates to the raw lead on the grids of the plates.

(2) By subjecting the positive plates to a partially charged environment ($SO_2$) it is possible to prevent excessive or hard sulphation which normally takes place on pasting the grids.

(3) By introducing a sulphite rather than a sulphate radical it is possible to decrease the amount of resistance on the plates which is apparent in the electrolyte; this also increases the effective distributed capacity.

(4) We have also found that a lead sulphite bond is much stronger from a torsion and material strength standpoint than the usual sulphate in the paste.

(5) We have also found that the permeability of $H_2SO_4$ into the pasted plates is greater because of a sulphite pre-associated condition as compared with positive plates processed in the usual manner.

The invention will be more readily understood by reference to the accompanying example, in which successive steps in the formation of the battery are set forth in order:

*Example*

(1) The positive plates were exposed to $SO_2$ gas in a pressure chamber at above atmospheric pressure before the plates were assembled in the cell for a period of time which will show oxidation visible through an opening or clear pressure chamber. During this step the color turns from the normal pasted plate color to a light gray color, indicating the presence of $Pb_3SO_4$.

(2) The negative plates were exposed to a $H_2O_2$ solution of not less than 18% and not more than 30% until oxidation began to appear between the grids and the paste. A 25% solution was found satisfactory. The plates were then removed, being careful not to stack the plates one upon the other.

(3) The positive and negative plates were then assembled to form the cell according to normal or standard procedure, care being used not to allow the positive and negative plates to make contact with each other except where the terminals are fused in the lead molds.

(4) Separators were employed which may be used repeatedly in forming the cells.

(5) The cells were then formed in a conventional manner in a "forming" sulphuric acid solution having a specific gravity of 1.075. These cells were formed in an open forming vessel for a period of 8.25 hours, using a charging rate between 10 and 14 amperes. They were then removed from the charging vessel and dried before new separators replaced the forming separator.

(6) The forming separators were then replaced with new separators and the battery was ready for the final charge. The electrolyte used for the final charge on the battery had a specific gravity of 1.320.

Various tests have been made comparing batteries produced in accordance with the present invention with conventional batteries having pasted plates identical to those produced in the present process except that the positive and negative plates had not been previously treated by exposure to $SO_2$ and $H_2O_2$, respectively.

The process was found to be very effective in accomplishing the objects previously set forth herein. The tests referred to above include charts indicating the various temperatures as indicated on the temperature chart under excessive charging conditions, and it is noted that the temperature effect or the charging effect has much less variation in the research battery than was noted in the conventional battery.

It is noted that the gravity changes are less affected in the research battery compared to the conventional battery. In other words, gravity change is greater in the conventional battery than the gravity change in the research battery.

It is noted that the voltage on a conventional cell discharged at the rate of 105 amperes for 65 minutes had dropped to .4 volt and the research cell in the same time and amperage discharge had dropped only to 1.4 volts. This indicates that there is less effective resistance in the research cell than in the conventional cell.

In following the notes closely on the charts one can easily see on the gravity chart where the conventional cell begins to fail completely during the vibration test.

Summary

It is possible to expose positive and negative plates of a lead acid cell battery to the environment of compounds inter-related to those in a charged condition and form the plates more perfectly at a reduced cost in charging current and time, therefore reducing the cost of fabrication.

The battery life is increased considerably in the research battery over the battery life of a conventional battery. The normal faults which cause battery failure have been reduced in this system and by open forming to the extent that a battery can be guaranteed for a period in excess of five years and being relatively sure of a very, very small percentage of failure or replacement.

The battery performance during its life is much more uniform than that of the standard or conventional battery. The battery may be exposed to longer periods of discharge without dissipating its energy to the extent that it is no longer usable until recharged.

The performance of the research battery will be much more efficient than the performance of a conventional battery.

Buckling of the plates under the same conditions of charge and discharge were noted in the conventional battery and were not present in the research battery.

Considerable shedding of the material was noted in the conventional battery and was not present in the research battery.

Tree growth or a compound oxide growth was noted in the conventional battery and was not present in the research battery.

All of the above factors have a tendency to determine the life or cause "fault failure" of a battery and which are noted in the conventional battery. In the research battery these causes of failure have been corrected by the present process. Therefore, it is anticipated that the causes of faults and failure being reduced in the research battery a battery can be produced for less money, have more efficiency and the guarantee period can be greatly extended.

We claim:

1. In a process of forming a storage battery of the pasted lead plate type wherein positive and negative plates are employed, which comprises a grid of lead or lead alloy having a paste thereon comprising essentially lead oxide and an electrolyte comprising principally sulphuric acid, which plates when charged and immersed in the sulphuric acid are electrically charged in a conventional manner, the improvement which comprises treating the positive pasted plates prior to assembly and charging with $SO_2$ gas under superatmospheric pressure of from 4 to 15 pounds per square inch until the color of the paste turns to a light gray, indicating the presence of sulphite, and treating the negative plates prior to charging with a solution of $H_2O_2$ until oxidation begins to appear between the grids and the paste of the plate, and thereafter assembling the plates in an acid electrolyte and charging the plates.

2. A storage battery produced in accordance with the process of claim 3.

3. In a process of forming a storage battery of the pasted lead plate type wherein positive and negative plates are employed, which comprises a grid of lead or lead alloy having a paste thereon comprising essentially lead oxide and an electrolyte comprising principally sulphuric acid, which plates when charged and immersed in the sulphuric acid are electrically charged in a conventional manner, the improvement which comprises treating the positive pasted plates prior to assembly and charging with $SO_2$ gas under superatmospheric pressure until the color of the paste turns to a light gray, indicating the presence of sulphite, and treating the negative plates prior to charging with a solution of $H_2O_2$ until oxidation begins to appear between the grids and the paste of the plate, and thereafter assembling the plates in an acid electrolyte and charging the plates.

References Cited in the file of this patent

UNITED STATES PATENTS

| | | |
|---|---|---|
| 1,284,426 | Morrison | Nov. 12, 1918 |
| 2,658,097 | Orsino | Nov. 3, 1953 |
| 2,835,719 | Bazalgette | May 20, 1958 |